Figure 3:
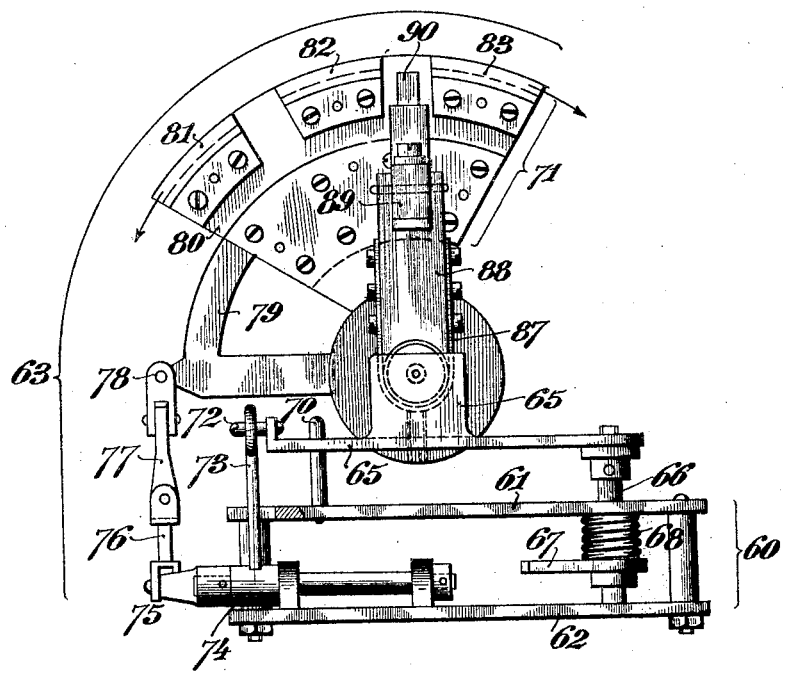

Sept. 29, 1925.
H. JUNGHANS ET AL
1,555,497
DIRECTION INDICATOR FOR VEHICLES
Filed Feb. 8, 1924    4 Sheets-Sheet 1
Fig.1.
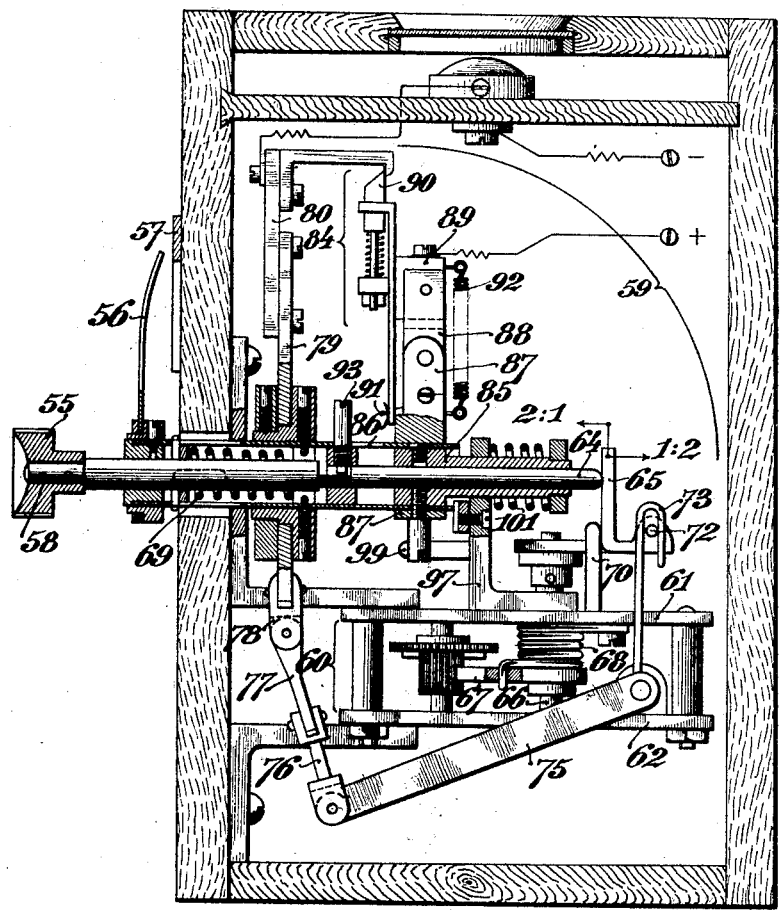
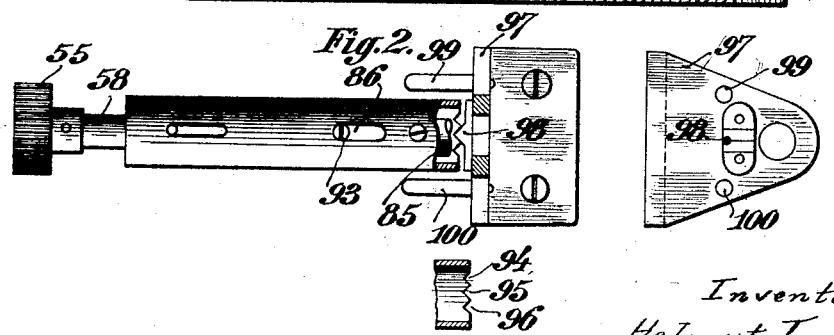
Inventors:
Helmut Junghans
and Fritz Glogauer
By [signature]
Attorney.

Sept. 29, 1925.  1,555,497

H. JUNGHANS ET AL

DIRECTION INDICATOR FOR VEHICLES

Filed Feb. 8, 1924    4 Sheets-Sheet 2

Inventors:
Helmut Junghans
and Fritz Glogauer
By
Attorney

Sept. 29, 1925.                                              1,555,497
H. JUNGHANS ET AL
DIRECTION INDICATOR FOR VEHICLES
Filed Feb. 8, 1924                4 Sheets-Sheet 3
Fig.5.
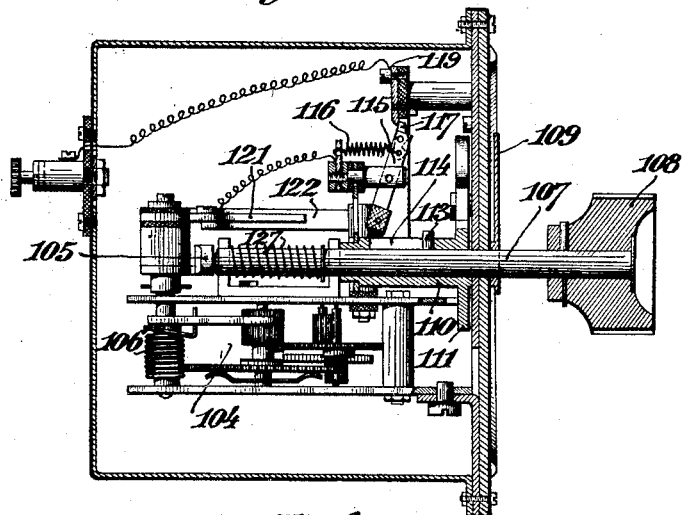
Fig.6.
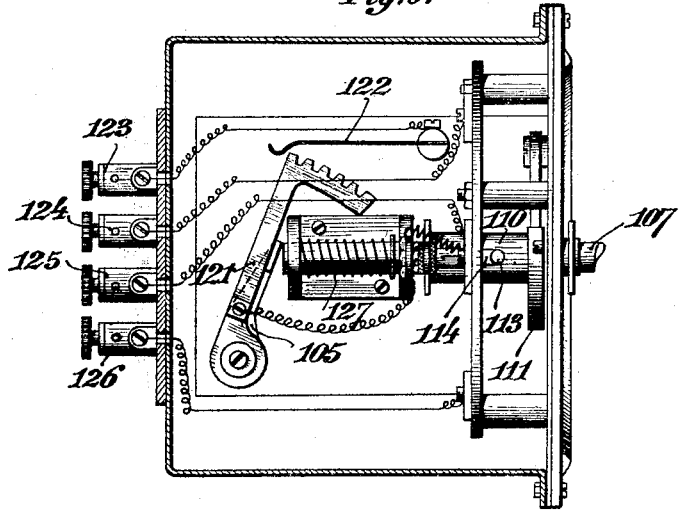
Fig.8.  Fig.9.  Fig.10.
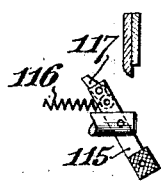 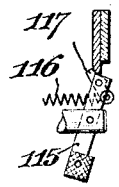 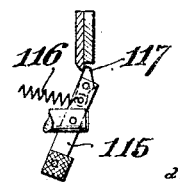
Inventors:
Helmut Junghan.
and Fritz Glogauer
By
Attorney.

Sept. 29, 1925.

H. JUNGHANS ET AL 1,555,497

DIRECTION INDICATOR FOR VEHICLES

Filed Feb. 8, 1924     4 Sheets-Sheet 4

Inventors:
Helmut Junghans
and Fritz Glogauer
By
Attorney.

Patented Sept. 29, 1925.

1,555,497

UNITED STATES PATENT OFFICE.

HELMUT JUNGHANS, OF GUT BERNECK, NEAR SCHRAMBERG, GERMANY, AND FRITZ GLOGAUER, OF CINCINNATI, OHIO.

DIRECTION INDICATOR FOR VEHICLES.

Application filed February 8, 1924. Serial No. 691,501.

*To all whom it may concern:*

Be it known that we, (1) HELMUT JUNGHANS, a citizen of the Republic of Germany, residing at Gut Berneck, near Schramberg, Germany, and (2) FRITZ GLOGAUER, a citizen of the United States of America, residing at No. 2201 Easthill Avenue, in the city of Cincinnati, Ohio, U. S. A., have invented certain new and useful Improvements in Direction Indicators for Vehicles, of which the following is a specification.

This invention relates to improvements in apparatus for use in vehicles, especially power driven vehicles, for indicating the direction in which a vehicle is about to travel, and more particularly to an apparatus of the kind in which electric signals, indicating to all around that the vehicle is turning towards the left or right hand or coming to a standstill, are switched on by hand and switched off again automatically. Switch arrangements for this purpose have already been proposed, in which the pressing of a button or shaft completes signalling circuits which are then broken again automatically from the steering mechanism for example in taking a curve. The object of the present invention is to provide an improved apparatus of the kind which presents the advantages of great simplicity, compactness and reliability of action, and we obtain these advantages in a general way, by connecting a switch mechanism, for completing the signalling circuit by hand, with a train of clockwork in such a way that every switching on operation by hand is reversed by the clockwork after a certain interval of time. Moreover, the arrangement is such that, by means of a single train of clockwork several switching operations, such for example as those for turning to the right or left or coming to standstill, can be performed in any desired order and predetermined time. The clockwork can be driven by a spring, electrically, or in any other suitable manner.

Figure 4:
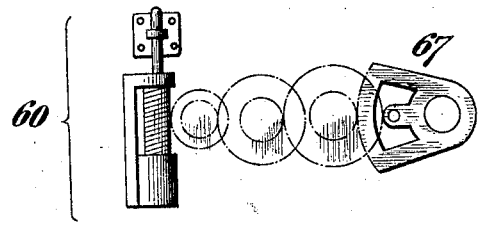
Figure 11:
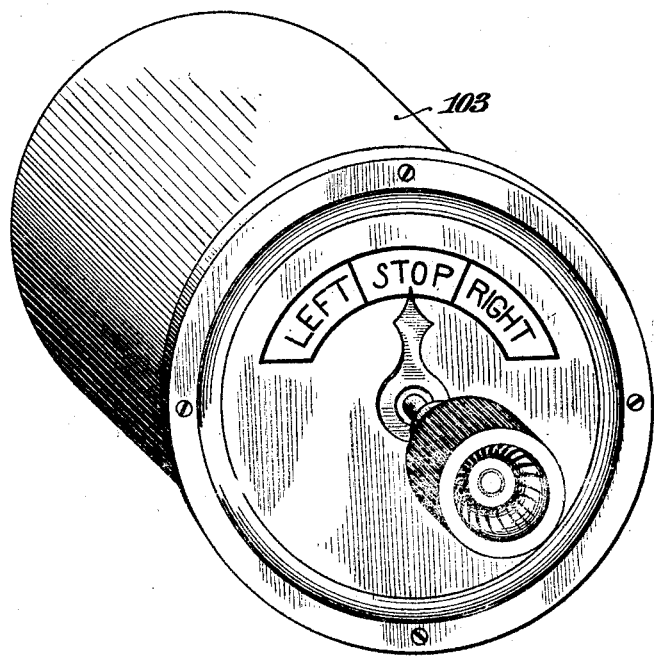
Figure 7:
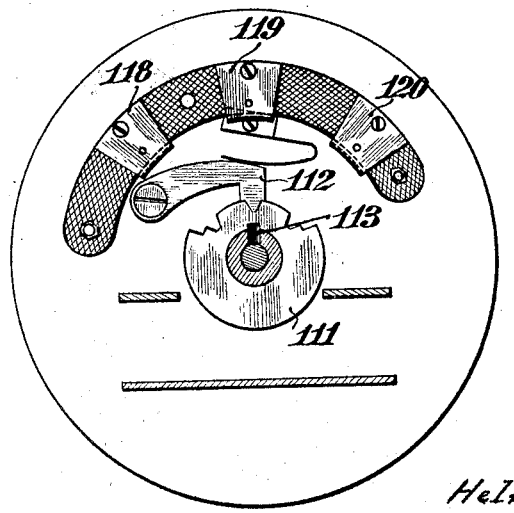

The accompanying drawings forming part of this specification illustrate two typical embodiments of the invention, the one of which being intended to serve as a demonstration model, and in which the signals, in the form of electric lamps, are incorporated in the device. A separate lamp (for example a differently coloured lamp) is provided for each signal, that is for turning to the right and left and stopping, all of which lamps, in the practical application of the device, are mounted on the vehicle in such positions as to be visible from both front and rear. The signals may also be transparent. The apparatus or device itself is mounted on the dashboard of the vehicle and within reach of the driver. In the drawings Figures 1 to 4 illustrate the one embodiment of the invention, Figure 1 being a longitudinal section through the apparatus; Fig. 2 shows details of the switch mechanism; Fig. 3 is a rear view of the apparatus and Fig. 4 represents a typical embodiment of the train of clockwork. Figures 5 to 10 illustrate the other embodiment of the invention, Figure 5 being a vertical longitudinal section of the apparatus and Figure 6 a horizontal section thereof; Figure 7 is a section taken on the line 5—5 of Figure 5; Figures 8, 9 and 10 are sectional views of a detail in several operating positions and Figure 11 is a perspective view of the casing in which the apparatus is mounted or housed when applied in practice and such case is preferably mounted on the dashboard of the vehicle close to the steering wheel.

The embodiment of the present invention shows in Figures 1 to 4 two main portions: namely a train of clockwork 60 known in itself or in connection with, for example, devices for measuring short periods of time and mounted between two plates, and a switch mechanism 63, Fig. 3, mounted on the clockwork 60. The clockwork and switch mechanism are operated by the press knob 55 on the switch shaft 58, which is provided with a pointer 56 mounted in front of a face 57 bearing corresponding inscriptions, for example: "Left," "Stop," "Right," as shown in Figure 11. The clockwork 60 is wound up by the shaft 58 which also adjusts and couples up the switch mechanism 63. The clockwork 60 is wound up by pressing on the knob 55, so that by the resulting axial displacement of the shaft 58 the end 64 thereof acts to displace a winding lever 65 which in turn actuates a winding shaft 66 having a driving wheel or segment 67 and a clock spring 68. When thus, the shaft 58 is pushed inwards, it presses the winding lever backwards to wind up the clockwork 60. When the shaft 58 is then released, it is driven quickly forward into its original position by a spiral spring 69, and thus releases the winding lever and allows the clockwork 60 to run. The clockwork keeps on running until the winding lever 65 has returned to its original position, that is until it reaches its stop pin 70 riveted in the plate 61.

In the apparatus illustrated, the clockwork 60 is charged with the task of driving the segment shaped switch member 71, of the switch mechanism 63 (Fig. 3). This is accomplished by means of the winding lever 65 which is positively connected thereto by the train of levers or rods 72, 73, 74, 75, 76, 77, and 78 in such a way that, when the winding lever 65 moves in the direction of the arrow (Fig. 3 right) and vice versa, the switch member 71 moves accordingly, in the direction of the arrow (Fig. 3 left) and vice versa.

The segment-shaped switch-member 71 (Fig. 3) consists of a segment 79 on the perimeter of which is mounted an insulating plate 80. On this latter, a number of U shaped contact pieces 81, 82 and 83, each provided with a current lead wire, are arranged at regular intervals. The entire contact member is mounted so as to be freely rotatable round the shaft 58 and is positively coupled with the winding lever 65 as already mentioned. Directly opposite it, but positively mounted on the shaft 58, is arranged a second contact member 84 (Fig. 1). This member consists of a hub 85 with a switch-stud slot 86 and an insulator carrier 87 secured on the hub; a pole carrier 89 tiltably mounted thereon and having a snap catch 90 flexibly mounted on its one end, and a small insulating plate 91 secured on the other end. In the zero or resting position, the pole carrier 89 is drawn out of its vertical position by a coiled spring 92 attached to it by one end and to the insulator 88 at the other end, until it bears, by means of the small insulating plate 91, against a switch stud 93 mounted on the shaft 58. The hub 85 (Fig. 2) is provided with three notches 94, 95, and 96, in which engages a projection 98 mounted on the switch shaft plate 97. In this way the shaft 58 and with it, in a positive manner, the hub 85 with the entire pole carrier 89 can be turned laterally to three different and definite positions, these positions corresponding to the setting of the pointer 56 or to the inscriptions on the dial 57, the limiting stops 99 and 100 (Fig. 2) mounted in the plate 97 preventing the shaft from being turned too far to the right or left.

In order to prevent the shaft from the turning accidentally or automatically that is, unless by design, the hub 85 and therefore also the shaft 58 is kept pressed against the projection 98 (Fig. 2) by the spiral spring 101 (Fig. 1) situated between a collar on the hub 85 and the plate 97.

The contact member 84 is secured to the shaft 58 in such a way that in the position of repose the pole carrier 89, with the snap catch 90, comes into position exactly in one of the spaces between the sliding contacts 81, 82, and 83.

The apparatus operates in the following manner:

When the pointer 56 is set opposite the desired signal by turning the knob 55 and the shaft 58, the entire contact member 84 is brought against the one end of the sliding contact 81, 82 or 83 which corresponds to the desired signal, the shaft 58 thereupon catching in one of the notches 94, 95 or 96, respectively. If the knob 55 with the shaft 58 be then pushed in as far as it will go, not only is the clockwork wound up thereby, but also the segment shaped contact member 71 (Fig. 3) is displaced laterally so that the contact member 84, set in the first place, no longer stands on the previously facing extremity of its corresponding sliding contact member 81, 82 or 83, but on the opposite extremity thereof, that is, on its beginning (direction of rotation according to the arrow, Fig. 3 left).

The contact is completed by the shaft 58 carrying with it the attached switch stud 93 (Fig. 1) during approximately the last one third of its travel this stud pressing against the springy pole carrier 89 and causing its snapcatch 90 to give way and then engage firmly under the edge of the corresponding sliding-contact member 81, 82 or 83. When the knob 55 is released, the clockwork starts running as already mentioned and thereby pushes the contact-member 81, 82 or 83 which is in operation at the time along the snap catch 90, until a space between the contact members is reached and the pole carrier 89 and its snap catch 90 are thereby caused to spring back into the original position thus breaking the contact again.

The hereinafter described embodiment of the invention and also that to be described and shown in Figs. 5 to 10 may be housed in a casing 103 illustrated in Fig. 11 and mounted on the dashboard of the vehicle within the reach of the driver so as to be readily at hand.

In the embodiment of the invention illustrated in Figs. 5 to 10 the apparatus comprises a clockwork 104 of a running period of any desired and suitable length of time. The winding arm 105 of the clock spring 106 likewise bears against a longitudinally displaceable shaft 107 the outer end of which is provided with a knurled knob 108. Intermediate between the said knob and the face bearing the inscription "Left", "Stop" and "Right" a pointer 109 is mounted on the shaft, as will be readily understood from an inspection of Figure 11. Loosely mounted on the shaft 107 is a sleeve 110 having a disk 111 at its front end rigidly connected thereto or integral therewith and provided with three recesses for a catch 112 to engage therein, as will be seen in Figure 7. The three recesses correspond to the setting of the pointer 109 on or over the afore stated three signalling inscriptions where the catch 112 acts in each case to lock the disk 111 and therefore the shaft 107 in the set angular position. By means of catch 112 and disk 111 the operator can determine the circuit selected merely by feeling when the catch snaps into the respective recess in the disk and, therefore, it is not necessary to look at the indicator. This action can, therefore, be called an indicator.

Firmly connected to the shaft 107 is a pin 113 extending and passing through an elongated slot 114 of the sleeve 110 in order to allow the shaft to longitudinally slide in the sleeve. The pin 113 is adapted to co-operate with a contact arm 115 for closing the individual electric circuits of the different signals. The arm 115 is pivoted to the sleeve 110, a spring 116 serving to normally hold the arm with its lower end in resilient contact with the pin 113. Pivoted to the upper end of the arm 115 is a catch 117 adapted to turn and move from its normal or rest position in one direction, that is towards the left hand side in Figure 5. The contact arm can be moved, by turning the shaft 107, to be set with relation to any one of three insulated contact pieces 118, 119 and 120, Figs. 5 and 11, which are connected with the three signals, respectively in any suitable manner by means of usual conductors. Rigidly connected with the winding arm 105 on the shaft of the clock spring 106 is a switch-arm 121 co-operating with a contact spring 122 which is connected with the one terminal of the electric source of current, whilst the arm 121 is electrically connected with the contact arm 115, but properly insulated as regards the adjacent metallic parts. The said contact-arm is shaped at its free and to form a toothed segment for the spring 122 to engage in successively as the wound-up clockwork unwinds, so that the electric circuit does not remain continuously closed during the unwinding period, but is correspondingly opened in succession whereby the signal will intermittently become visible or audible. The required electric connections in the apparatus comprise terminals 123, 124, 125 and 126 in the back wall of the casing and the arrangement of these terminals affords a ready means for easily fitting up the conductors going to the signals and to the source of current.

Coiled on the switch-shaft 107 is a spring 127 which on any longitudinal displacement of the shaft is compressed in order to automatically return the shaft to its normal position when the pressure on the knob 108 that caused said displacement ceases.

The operation of the apparatus is similar to that described with reference to the embodiment shown in Figures 1 to 4. Supposing a signal such as a shield illuminated by a lamp and indicating that the driver intends to turn the vehicle towards the left or right hand or to come to a standstill, shall be made visible, the driver must turn the knob 108 to bring the pointer 109 to the position over the inscription e. g. to "Stop" as shown in Figure 11. In accordance therewith the contact arm 115 will be in the position shown in Figure 8. Now the driver pushes the shaft 107 inwards and thereby causes the winding arm 105 and therefore the switch arm 121 to turn back that is to say towards the terminals 123, 124, 125 and 126, whereby the clock spring 106 is energized, whilst at the same time the contact arm 115 with its catch 117 is turned to the position shown in Figs. 5 and 10, whereby an electric connection through contact with the corresponding contact piece will be brought about and the circuit of the signal be closed.

In thus setting the contact arm 115 the catch 117 turns about its pivot towards the left hand side against the action of the spring 116, as will be clearly seen in Fig. 9, so as to be able to freely pass below the projecting ends of the contact pieces, in order to come in engagement with the front face of the contact piece to close the circuit, as soon as the switch shaft 107 has returned, under the action of the spring 116, to its normal position. The clockwork now runs and at the same time the switch arm 121 moves over the contact spring 122, keeping the circuit closed for a certain predetermined period, either continuously or, as in the shown construction of the arm 121, intermittently. During the whole of the length of the period the signal is correspondingly visible (or audible) whereupon it will disappear through automatic disconnection so that the driver needs not pay any further attention to the signalling apparatus.

This construction of the switching mechanism enables a single clockwork to be used for all signals and switching operations, and the relatively independent arrangement of the switch mechanism and clockwork enabling any desired switching operation into or out of action to be effected in an instant, irrespective of the movement of the clockwork.

The attention of passers by to the signals is undoubtedly increased if the signals be given and interrupted at short intervals for example: light on; light out; on; out; and so on. In order to enable this to be done a number of intermediate insulating surfaces may also be provided on the several contact pieces 81, 82, 83 of the embodiment described with reference to Figures 1 to 4, in a manner that the circuit is repeatedly broken as the contact member 84 slides over them.

Though I have described with great particularity of detail two specific embodiments of my invention, yet it is not to be understood therefrom that the invention is limited to the particular embodiments disclosed. Various modifications in detail and in the arrangement and combination of the parts may be made by those skilled in the art, without departing from the invention.

What is claimed is:—

1. An electric switch for a direction indicator for vehicles comprising a casing; a clockwork mounted in said casing; a rotatable and slidable shaft mounted in said casing; a pair of contacts operated by said clockwork; a pivoted contact arm adapted to be shifted by the rotary action of said shaft; and a plurality of contacts adapted to cooperate with said pivoted contact arm by the selective operation of said shaft to select a specific circuit which is closed and remains closed during the action of said clockwork operating said pair of contacts.

2. An electric switch for a direction indicator for vehicles comprising a casing; a clockwork; a pair of contacts operated by said clockwork; a rotatable and slidable shaft mounted in said casing; a plurality of selective contacts adapted to close several circuits; and means including said shaft for selectively setting said selective contacts to select a specific circuit which remains closed during the action of said clockwork by means of said pair of contacts.

3. A direction indicator for vehicles comprising a switch mechanism including an axially displaceable and rotatable switch shaft, a pointer mounted on said shaft and adapted to move and be set therewith, a clockwork, and a contact mechanism including a plurality of mutually insulated contact pieces located in a circular path, a sleeve on said shaft having an elongated slot, a pin on the shaft engaging in said slot, a disk rigidly connected with the sleeve and having a number of recesses corresponding to the number of contact pieces, and a resilient catch adapted to engage in any one of the said recesses in accordance with the setting of the shaft and pointer, substantially as and for the purpose set forth.

4. An electric switch for a direction indicator for vehicles comprising a casing; a plurality of contacts in said casing; a pivoted contact arm adapted to cooperate with said contacts; a switch arm and contact spring mounted in said casing; a clockwork for operating said switch arm; and means for selectively setting said pivoted contact arm relative to said plurality of contacts for a specific circuit and for winding said clockwork in order to operate the switch arm to close the selected circuit, said circuit remaining closed during the operation of the clockwork by means of said switch arm and said contact spring.

5. An electric switch for a direction indicator for vehicles comprising a casing; a plurality of contacts in said casing; a pivoted contact arm adapted to cooperate with said contacts; a switch arm and contact spring mounted in said casing; a clockwork for operating said switch arm; and a rotatable and slidable shaft for selectively setting said pivoted contact arm relative to said plurality of contacts for a specific circuit and for winding said clockwork in order to operate the switch arm to close the selected circuit, said circuit remaining closed during the operation of the clockwork by means of said switch arm and said contact spring.

6. An electric switch for a direction indicator for vehicles comprising a casing; a plurality of contacts in said casing adapted to close a plurality of circuits; a pivoted contact arm adapted to cooperate with said contacts, said contact arm having a spring pressed catch member adapted to engage one of said plurality of contacts; a clockwork in said casing; and means for selectively setting said pivoted contact arm to close a specific circuit and for winding said clockwork in order to operate the contacts for the selected circuit.

7. An electric switch for a direction indicator for vehicles comprising a casing; a plurality of contacts in said casing adapted to close a plurality of circuits; a pivoted contact arm adapted to cooperate with said contacts, said contact arm having a spring pressed catch member adapted to engage one of said plurality of contacts; a clockwork in said casing; and a rotatable and slidable shaft for selectively setting said pivoted contact arm to close a specific circuit and for winding said clockwork in order to operate the contacts for the selected circuit.

8. An electric switch for a direction indicator for vehicles comprising a casing; a plurality of contacts in casing adapted to close a plurality of circuits; a clockwork in said casing; a toothed switch arm and contact spring for intermittently closing a circuit through said contacts; and a rotatable and slidable shaft for selectively setting said contacts to close a specific circuit and for winding said clockwork in order to operate said first-named means.

9. An electric switch for a direction indicator for vehicles comprising a casing; a plurality of contacts in said casing; a clockwork; means for selectively setting said contacts to select a specific circuit and for winding said clockwork in order to close the selected circuit through said contacts; and means for controlling the movement of said first-named means for indicating the selected circuit.

10. An electric switch for a direction indicator for vehicles comprising a casing; a plurality of contacts in said casing; a clockwork; a rotatable and slidable shaft for selectively setting said contacts to select a specific circuit and for winding said clockwork in order to close the selected circuit through said contacts; and means for controlling the movement of said shaft for indicating the selected circuit.

11. An electric switch for a direction indicator for vehicles comprising a casing; a plurality of contacts in said casing; a clockwork; a rotatable and slidable shaft for selectively setting said contacts to select a specific circuit and for winding said clockwork in order to close the selected circuit through said contacts; and a disk and a resilient catch for controlling the movement of said shaft for indicating the selected circuit.

In testimony whereof we affix our signatures.

HELMUT JUNGHANS.
FRITZ GLOGAUER.